US011693258B2

(12) United States Patent
Wietschorke

(10) Patent No.: US 11,693,258 B2
(45) Date of Patent: Jul. 4, 2023

(54) COMPUTER-IMPLEMENTED METHOD FOR FITTING A SPECTACLE LENS TO A SPECTACLE FRAME

(71) Applicant: Carl Zeiss Vision International GmbH, Aalen (DE)

(72) Inventor: Helmut Wietschorke, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 17/676,528

(22) Filed: Feb. 21, 2022

(65) Prior Publication Data

US 2022/0171213 A1    Jun. 2, 2022

Related U.S. Application Data

(63) Continuation of application No. PCT/EP2020/074158, filed on Aug. 28, 2020.

(30) Foreign Application Priority Data

Sep. 3, 2019 (EP) ..................................... 19195132

(51) Int. Cl.
    *G02C 7/06* (2006.01)
    *G02C 7/02* (2006.01)
    *G02C 13/00* (2006.01)

(52) U.S. Cl.
    CPC ............. *G02C 7/027* (2013.01); *G02C 7/068* (2013.01); *G02C 13/005* (2013.01)

(58) Field of Classification Search
    CPC ....... G02C 7/027; G02C 7/068; G02C 13/005
    (Continued)

(56) References Cited

U.S. PATENT DOCUMENTS

| 4,524,419 A | 6/1985 | Headlund et al. |
| 5,042,936 A | 8/1991 | Guilino et al. |

(Continued)

FOREIGN PATENT DOCUMENTS

| DE | 102007020031 A1 | 10/2008 |
| DE | 102012000390 A1 | 7/2013 |

(Continued)

OTHER PUBLICATIONS

International Preliminary Examination Report issued in PCT/EP2020/074158, to which this application claims priority, dated Dec. 23, 2021, and English-language translation thereof.

(Continued)

*Primary Examiner* — Tuyen Tra
(74) *Attorney, Agent, or Firm* — Tautz & Schuhmacher LLC; Georg Hasselmann

(57) ABSTRACT

A computer-implemented method for fitting a spectacle lens, which has a first spectacle lens surface, a second spectacle lens surface, and at least one dioptric power to be obtained, to a spectacle frame with a certain frame edge curve is made available. In the method, a free-form surface formed on a first spectacle lens surface is fitted to the frame edge curve of the spectacle frame. The free-form surface is fitted to the frame edge curve by virtue of the free-form surface and the second spectacle lens surface being optimized with regard to minimizing the difference between the free-form surface edge curve and the frame edge curve and with regard to achieving the at least one dioptric power to be obtained with the spectacle lens.

11 Claims, 2 Drawing Sheets

(58) Field of Classification Search
USPC ...... 351/41, 159.01, 159.73, 159.74, 159.75, 351/159.76
See application file for complete search history.

(56) References Cited

U.S. PATENT DOCUMENTS

| | | | |
|---|---|---|---|
| 5,450,335 | A | 9/1995 | Kikuchi: Yoshihiro |
| 5,485,399 | A | 1/1996 | Saigo et al. |
| 5,959,199 | A * | 9/1999 | Suzuki .................. B24B 9/144 |
| | | | 73/104 |
| 7,347,546 | B2 | 3/2008 | Esser et al. |
| 8,308,294 | B2 | 11/2012 | Dubois et al. |
| 8,313,194 | B2 | 11/2012 | Colas et al. |
| 8,447,573 | B2 | 5/2013 | Allione et al. |
| 8,540,367 | B2 | 9/2013 | Dubois et al. |
| 8,757,800 | B2 | 6/2014 | Esser et al. |
| 9,910,294 | B2 | 3/2018 | Altheimer et al. |
| 10,345,618 | B1 | 7/2019 | Rego et al. |
| 2018/0307058 | A1 | 10/2018 | Welscher et al. |
| 2020/0050020 | A1 | 2/2020 | Welscher et al. |

FOREIGN PATENT DOCUMENTS

| | | |
|---|---|---|
| EP | 576268 A1 | 12/1993 |
| EP | 583915 A2 | 2/1994 |
| EP | 2028533 A1 | 2/2009 |
| EP | 1656581 B1 | 12/2010 |
| EP | 2028527 B1 | 1/2013 |
| EP | 2028531 B1 | 5/2016 |
| WO | 8904986 A1 | 6/1989 |
| WO | 2007017766 A2 | 2/2007 |
| WO | 2008089999 A1 | 7/2008 |
| WO | 2014198894 A1 | 12/2014 |
| WO | 2018193134 A2 | 10/2018 |

OTHER PUBLICATIONS

First Examination Report by the European patent office issued in EP 20768284.0, which is a counterpart application hereof, dated Aug. 12, 2022, and English-language machine translation thereof.
"Ophthalmic optics—Spectacle lenses—Vocabulary (ISO 13666:2012)," German and English version EN ISO 13666:2012, Oct. 2013.
"Ophthalmic optics—Terms and definitions related to free-form technology," German and English version DIN SPEC 58194, Dec. 2015.
European Search Report issued in EP19195132.6, to which this application claims priority, completed Mar. 11, 2020.
International Search Report issued in PCT/EP2020/074158, to which this application claims priority, dated Dec. 3, 2020, and English-language translation thereof.
Written Opinion issued in PCT/EP2020/074158, to which this application claims priority, dated Dec. 3, 2020.
Office Action by the European Patent Office (EPO) issued in EP 20 768 284.0, which is a counterpart hereof, dated Mar. 20, 2023, and English translation thereof.

* cited by examiner

COMPUTER-IMPLEMENTED METHOD FOR FITTING A SPECTACLE LENS TO A SPECTACLE FRAME

CROSS REFERENCE TO RELATED APPLICATIONS

This application is a continuation application of international patent application PCT/EP2020/074158, filed Aug. 28, 2020, designating the United States and claiming priority from European application 19195132.6, filed Sep. 3, 2019, and the entire content of both applications is incorporated herein by reference.

TECHNICAL FIELD

The present disclosure relates to a computer-implemented method for fitting a spectacle lens having a first spectacle lens surface and a second spectacle lens surface to a spectacle frame having a frame edge curve. Additionally, the disclosure relates to a computer program having instructions to carry out the method, a non-volatile, computer-readable storage medium with the computer program stored thereon, and a data processing system for fitting a spectacle lens having a first spectacle lens surface and a second spectacle lens surface to a spectacle frame having a frame edge curve.

BACKGROUND

The design of a spectacle lens is not only defined by its target dioptric power for the spectacle lenses but further factors such as, for example, the conditions in which the spectacles are used, the shape of the spectacle frame or specifications in relation to the bending of the spectacle lens front surface or of the spectacle lens back surface, for example for obtaining a meniscus shape of the spectacle lens, may also determine the geometry of the spectacle lens. In this case, the shape of the spectacle lens frame is important not only for a correct simulation of the position of the manufactured spectacle lenses in front of the eye and for a center thickness optimization of the spectacle lenses, but also influences the esthetics of the finished spectacles together with the spectacle lens front surface. A rimmed spectacle lens whose rim on its front surface has a very good correspondence with the rim of the spectacle frame selected by the spectacle wearer will lead to a very esthetic pair of spectacles in this case and allows the spectacle lens to be ground into the selected frame without problems. The rim of the spectacle frame relevant to the insertion of a spectacle lens into the spectacle frame can be represented by a three-dimensional frame edge curve, which usually represents either the rim of the frame at its front side or the curve of the frame groove in the spectacle frame. By way of example, this three-dimensional frame edge curve can be represented sufficiently well by a number of three-dimensional measurement points on this curve. By way of example, the three-dimensional measurement points can be measured using a suitable measuring device.

Taking account of the curve, that is to say the bending of the shape of the spectacle lens frame, when selecting a suitable spectacle lens front surface in order to obtain not only an improvement in the optical characteristics but also an improvement in the comfort of wear is known from EP 1 656 581 B 1. A method for determining a first spectacle lens surface in which the first spectacle lens surface is determined in such a way that both the difference between its curvature and a specified target curvature and the difference between its edge curve and a specified frame edge curve are minimized has been disclosed in WO 2014/198894 A1. The second spectacle lens surface may then be determined with the aid of the method described in WO 2007/017766 A2. Methods in which the curvature of the spectacle lens front surface is suitably chosen in view of the frame edge curve are known from EP 2 028 527 B1, EP 2 028 531 B1 and EP 2 028 533 A1. Subsequently, the spectacle lens back surface can then be optimized in view of its optical characteristics and in view of the geometry of the spectacle frame, as described in EP 2 028 533 A1. As a result, the spectacle lens terminates better on the frame. However, a spectacle lens where the edge of the spectacle lens front surface may noticeably differ from the three-dimensional frame edge curve generally still is obtained in this case. This applies, in particular, to spectacle frames that are fitted very closely to the shape of the face. Such spectacle frames, and hence their frame edge curves, bend more strongly in the horizontal direction than in the vertical direction. Especially in the case of spectacle lenses with a spherical front surface, the edge of the spectacle lens front surface deviates noticeably from the frame edge curve, even in the case of a suitable base curve choice.

WO 2018/193134 A2 has disclosed a method that can be used to determine a base curve for a spectacle lens front surface on the basis of spectacle frame data. In this case, the base curve can be determined by fitting a free-form surface on the spectacle lens front side to the frame edge curve. However, it does not follow that a possibly used free-form surface with this base curve, the base curve having been determined in this way, also leads to a spectacle lens front surface that terminates very well on the frame edge. That is to say an optimal base curve does not guarantee the edge of the spectacle lens front surface also having a good correspondence with the frame edge curve. This also applies when the spectacle lens front surface is a free-form front surface. Moreover, in the absence of additional measures, simply fitting the free-form surface to the frame edge curve will generally only lead to a deterioration in the dioptric powers.

DE 10 2007 020 031 A1 has disclosed a method for producing a pair of spectacles, wherein the object-side surface of the spectacle lens is optimally fitted to the design of the frame and an optimization of the eye-side spectacle lens surface in view of attaining specified optical characteristics is implemented thereafter. In particular, the object-side surface can be a free-form surface. Even the procedure described in DE 10 2007 020 031 A1 may result in no satisfactory result being obtained.

It is therefore an object of the present disclosure to make available a computer-implemented method for fitting a spectacle lens having a first spectacle lens surface and a second spectacle lens surface to a spectacle frame having a frame edge curve, by means of which method the spectacle lens can be fitted particularly well to the frame edge curve without leading to a noticeable impairment in the dioptric power of the spectacle lens for the user. Additional objects of the present disclosure lie in making available a computer program, a data processing system and a non-volatile computer-readable storage medium with a computer program for fitting a spectacle lens having a first spectacle lens surface and a second spectacle lens surface to a spectacle frame having a frame edge curve, by means of which a spectacle lens can be fitted particularly well to the frame edge curve of a spectacle frame without leading to a noticeable impairment in the dioptric power of the spectacle lens for the user.

The specified objects are achieved by a computer-implemented method, a computer program, a data processing system, and a non-volatile computer-readable storage medium, wherein the simultaneous optimization of a free-form surface and a second spectacle lens surface is implemented iteratively. Exemplary embodiments are discussed below.

According to the disclosure, a computer-implemented method for fitting a spectacle lens having a first spectacle lens surface, a second spectacle lens surface and at least one intended dioptric power to a spectacle frame having a certain frame edge curve is made available. A free-form surface formed on a first spectacle lens surface is fitted to the frame edge curve of the spectacle frame in the method. The free-form surface is fitted to the frame edge curve by virtue of the free-form surface and the second spectacle lens surface being optimized simultaneously in view of minimizing the difference between the free-form surface edge curve and the frame edge curve and in view of attaining the at least one intended dioptric power of the spectacle lens, the free-form surface and the second spectacle lens surface mutually influencing one another during the optimization. Accordingly, an optimization where the free-form surface and the second spectacle lens surface are optimized simultaneously should be understood to mean an optimization in which the free-form surface and the second spectacle lens surface mutually influence one another during the optimization such that a change in the free-form surface also leads to a change in the second spectacle lens surface, and vice versa, for as long as the optimization targets have not been reached. In this context, a simultaneous optimization should mean, in particular, that the optimization of the first spectacle lens surface is only complete when the second spectacle lens surface is optimized too, and vice versa.

Free-form surface techniques allow the calculation of a free-form surface, in particular a free-form surface on the spectacle lens front surface, which leads to an edge curve of the spectacle lens that corresponds well to the frame edge curve in the region of the corresponding spectacle lens surface. As a result of the second spectacle lens surface, typically the spectacle lens back surface, also being optimized within the scope of the optimization, it is possible to attain two optimization targets, specifically, firstly, a minimization in the difference between the free-form surface edge curve and the frame edge curve and, secondly, the attainment of the at least one intended dioptric power of the spectacle lens, in particular the attainment of the at least one intended dioptric power of the spectacle lens for different lines of sight. The method according to the disclosure therefore facilitates accurate fitting of the spectacle lens to the frame edge curve without having to accept bothersome reductions in the optical quality of the spectacle lens, that is to say without the dioptric power of the spectacle lens being noticeably impaired for the user. Within the scope of the disclosure, a limitation in the dioptric power is considered not to noticeably impair the user if this limitation, in comparison with a spectacle lens not fitted to the frame edge curve, is only present in the peripheral region of the spectacle lens and cannot be perceived or can only hardly be perceived by the user. By contrast, if, for example like in DE 10 2007 020 031 A1, a free-form surface is initially optimally fitted to the frame edge curve and the second spectacle lens surface is subsequently optimized in view of the intended dioptric power, this optimization can only offer an optimal result for the already existing free-form surface. However, it might be the case that a significantly better optimization result can be obtained for the second spectacle lens surface in the case of an only slightly modified free-form surface so that a significantly better optimization result would be present overall. As a result of the simultaneous optimization of the free-form surface and second spectacle lens surface carried out in the method according to the disclosure it is possible to overcome the aforementioned problem.

It is typical within the scope of the method according to the disclosure if the second spectacle lens surface is a spherical spectacle lens surface, an aspherical spectacle lens surface, a toric spectacle lens surface or an atoric spectacle lens surface. With the aid of a suitable spectacle lens front surface in the form of a free-form surface, the dioptric requirements can be met particularly well in conjunction with a spherical, aspherical, toric or atoric second spectacle lens surface, and so the spectacle wearer does not experience any bothersome losses in respect of the imaging quality in the periphery even in the case of an accurate fit of the spectacle lens to the frame edge curve. In this context, the use of a spherical, aspherical, toric or atoric second spectacle lens surface offers the advantage that such a surface can easily be manufactured and moreover has a relatively low centration sensitivity in relation to the spectacle lens front surface in the form of a free-form surface.

If the first spectacle lens surface is the spectacle lens front surface and the second spectacle lens surface is the spectacle lens back surface it is possible to use proven methods for manufacturing individual spectacle lenses with a front-side free-form surface.

In the method according to the disclosure, the simultaneous optimization of the free-form surface and the second spectacle lens surface can be implemented iteratively. In this case, the second spectacle lens surface is modified first, and the free-form surface is subsequently optimized in each iteration step. As a result, the free-form surface on the first spectacle lens surface can in each case be optimized in relation to the currently present second spectacle lens surface such that, firstly, in the periphery the spectacle wearer does not experience any bothersome losses in respect of the imaging quality in the periphery and, secondly, there is a constantly improving fit of the free-form surface edge curve to the frame edge curve. In this case, for the iterative optimization, an initial spectacle lens having a first spectacle lens surface with a specified curvature may serve as a starting point. An initial spectacle lens having a first spectacle lens surface with a specified curvature, which as mentioned previously may be the spectacle lens front surface in particular, renders it possible to resort to a spectacle lens with a conventional base curve for the initial spectacle lens, and so the initial spectacle lens can be determined quickly and easily. In this case, the curvature prescription may already be implemented in view of the frame edge curve, that is to say take account of the curve of the frame. In particular, spectacle frames that are fitted quite significantly to the shape of the head, for instance spectacle frames for sports spectacles, have a significant curve. If the curve of such spectacles is not considered when specifying the curvature of the first spectacle lens surface, the optimization may require a great number of iteration steps in order to fit the spectacle lens front surface to the frame edge curve. If the curve is already taken into account when specifying the curvature of the first spectacle lens surface it is therefore possible to reduce the optimization outlay.

Within the scope of the iteration it is typical if the second spectacle lens surface is determined first in view of the at least one intended dioptric power of the spectacle lens in the first iteration step, and the free-form surface is subsequently optimized in view of attaining the at least one intended dioptric power of the spectacle lens using the spectacle lens, in particular in view of attaining the at least one intended dioptric power for many lines of sight when gazing through the spectacle lens. In this context, the use conditions may also be taken into account in both iteration steps. In this context, the at least one intended dioptric power of the spectacle lens may be specified by an optical target design in particular, and so the conventional optimization methods for optimizing spectacle lenses can be used. The described procedure allows a surface for the second spectacle lens surface to be chosen as the initial surface for the first iteration step which, in conjunction with a first spectacle lens surface that corresponds to a base curve specification, initially only approximately attains the at least one intended dioptric power of the spectacle lens, for example only in the optical center of the spectacle lens, simplifying the determination of the second spectacle lens surface in the first iteration step. Obtaining the at least one intended dioptric power of the spectacle lens can then be realized subsequently by way of suitably adapting the first spectacle lens surface that should be optimized in any case.

Within the scope of iterative optimization it is moreover typical if the value of a measure for the deviation of the free-form surface edge curve present after the optimization of the free-form surface from the frame edge curve is respectively determined following the optimization of the free-form surface in each iteration step. The method is terminated if the determined value of the measure for the deviation is less than a specified value or the change in that measure is less than a specified value. Otherwise, the second spectacle lens surface is suitably modified in a subsequent iteration step and the free-form surface is subsequently optimized again in view of attaining the at least one intended dioptric power of the spectacle lens, it being possible to use the conventional optimization methods for optimizing spectacle lenses. As a result, it is possible to realize an optimization method which automatically optimizes the spectacle lens until the deviation of the difference of the free-form surface edge curve from the frame edge curve no longer exceeds a specified limit or the change in the measure is less than a specified value, that is to say it is no longer possible to bring about a further noticeable reduction in the difference between the free-form surface edge curve and the frame edge curve. In the simplest case, the maximum sagittal height difference present in a difference edge curve can be taken as the measure, the difference edge curve representing the differences in the sagittal heights of the free-form surface edge curve and of the frame edge curve at mutually equivalent points of the two edge curves. Alternatively, the Euclidean norm of the absolute values of the sagittal height differences present in the difference edge curve, generally at selected points of the free-form surface edge curve and the frame edge curve, can be taken as the measure. Further measures, for example the simple summation of the absolute values of the sagittal height differences, the arithmetic mean of the absolute values of the sagittal height differences or the median of the absolute values of the sagittal height differences, are also possible. In this case, the sagittal height differences may also relate only to selected points on the free-form surface edge curve and the frame edge curve.

In a first configuration of the iterative optimization, the measure for the deviation is based on the difference edge curve. In this configuration, the second spectacle lens surface is modified on the basis of the difference edge curve. Then, the difference edge curve can be used to modify the second spectacle lens surface such that there can be targeted fitting of the second spectacle lens surface to the remaining difference between the sagittal heights of the free-form surface edge curve and the sagittal heights of the frame edge curve. In this case, the second spectacle lens surface can be modified, in particular, by virtue of fitting a third spectacle lens surface to the difference curve and at least one portion of the third spectacle lens surface being overlaid on the previously present second spectacle lens surface. In this case, it is typical if the third spectacle lens surface is taken from the same surface family that also includes the second spectacle lens surface. Then, the third spectacle lens surface is a spherical or toric spectacle lens surface if the second spectacle lens surface is a spherical or toric spectacle lens surface, and an aspherical or atoric spectacle lens surface if the second spectacle lens surface is an aspherical or atoric spectacle lens surface, etc. In the case of a toric second spectacle lens surface, a toric third spectacle lens surface would consequently be fitted to the difference edge curve and would subsequently be overlaid on the previously present toric second spectacle lens surface. The criteria for fitting the third spectacle lens surface to the difference edge curve can also be the same criteria as proposed for assessing the deviation of the sagittal heights of the free-form surface edge curve from the sagittal heights of the frame edge curve. Consequently, information about the differences between the sagittal heights of the free-form surface edge curve and of the frame edge curve in this procedure is available in the form of a third spectacle lens surface fitted to the second spectacle lens surface, allowing the second spectacle lens surface to be modified with little outlay.

In an alternative configuration of the iterative optimization, the second spectacle lens surface is modified with the aid of a variational method, that is to say within the scope of a method in which parameters of the second spectacle lens surface are varied. In the case of a toric second spectacle lens surface it is possible to vary the "radii" and "axis" parameters of the toric surface. Conventional variational methods can be used for the variation. Using a variational method the optimization can also be carried out without explicit knowledge of the difference edge curve.

There is the option within the scope of the iterative optimization of keeping the mean surface power of the second spectacle lens surface constant when varying the second spectacle lens surface. What such a boundary condition can achieve is that the mean curvature of the first spectacle lens surface at a reference point of the spectacle lens is not modified, or only modified within given boundaries, during the iterative optimization. Therefore, although, in general, not quite as good a fit of the free-form surface edge curve to the frame edge curve is obtainable as would be obtainable without this boundary condition, the use of this boundary condition nevertheless allows the sagittal height differences between the free-form surface edge curve and the frame edge curve to be reduced. Boundaries for the admissible modification of the curvature of the first spectacle lens surface may arise, for example, if the second spectacle lens surface may only have a minimum or maximum curvature for manufacturing reasons. Boundaries for the admissible modification of the curvature of the spectacle lens front surface may also arise by virtue of the intention being to maintain a meniscus shape of the spectacle lens.

According to a second aspect of the present disclosure, a computer program for fitting a spectacle lens having a first spectacle lens surface, a second spectacle lens surface and at least one intended dioptric power of the spectacle lens to a spectacle frame having a certain frame edge curve is made available. The computer program comprises instructions which, when executed on a computer, prompt the computer to fit a free-form surface formed on a first spectacle lens surface to the frame edge curve of the spectacle frame. Moreover, the computer program comprises instructions which, when executed on a computer, prompt the computer, for fitting the free-form surface to the frame edge curve, to simultaneously optimize the free-form surface and the second spectacle lens surface in view of minimizing the difference between the free-form surface edge curve and the frame edge curve and in view of attaining the at least one intended dioptric power of the spectacle lens, the free-form surface and the second spectacle lens surface mutually influencing one another during the optimization.

The computer program according to the disclosure allows the method according to the disclosure to be carried out on a computer and consequently allows the realization of the advantages linked to the method according to the disclosure with the aid of a computer. In particular, the computer program according to the disclosure may also be developed in such a way in this context that it facilitates the implementation of the developments described in relation to the method according to the disclosure on a computer.

According to a third aspect of the disclosure, a data processing systems for fitting a spectacle lens having a first spectacle lens surface, a second spectacle lens surface and at least one intended dioptric power of the spectacle lens to a spectacle frame having a certain frame edge curve is made available. The data processing system comprises a processor and at least one memory, the processor being embodied to fit a free-form surface formed on a first spectacle lens surface to the frame edge curve of the spectacle frame on the basis of instructions of a computer program stored in the memory. Moreover, the processor is embodied, on the basis of the instructions of the computer program stored in the memory for fitting the free-form surface to the frame edge curve, to simultaneously optimize the free-form surface and the second spectacle lens surface in view of minimizing the difference between the free-form surface edge curve and the frame edge curve and in view of attaining the at least one intended dioptric power of the spectacle lens, the free-form surface and the second spectacle lens surface mutually influencing one another during the optimization.

The data processing system according to the disclosure allows the method according to the disclosure to be carried out and therefore allows the realization of the advantages linked to the method according to the disclosure. Naturally, the data processing system may also be developed such that it facilitates the implementation of the development of the method according to the disclosure.

According to a fourth aspect of the present disclosure, a non-volatile computer-readable storage medium with instructions stored thereon for fitting a spectacle lens having a first spectacle lens surface, a second spectacle lens surface and at least one intended dioptric power of the spectacle lens to a spectacle frame having a certain frame edge curve is made available. If the instructions are executed on a computer, they prompt the computer to fit a free-form surface formed on a first spectacle lens surface to the frame edge curve of the spectacle frame. Moreover, the storage medium comprises instructions stored thereon which, when executed on a computer, prompt the computer, for fitting the free-form surface to the frame edge curve, to simultaneously optimize the free-form surface and the second spectacle lens surface in view of minimizing the difference between the free-form surface edge curve and the frame edge curve and in view of attaining the at least one intended dioptric power of the spectacle lens, the free-form surface and the second spectacle lens surface mutually influencing one another during the optimization.

The computer-readable storage medium according to the disclosure allows the computer program according to the disclosure to be loaded onto a computer or a data processing system according to the disclosure and hence allows the implementation of the method according to the disclosure in order to achieve the advantages described in relation to the method according to the disclosure. Naturally, the computer-readable storage medium may also comprise information stored thereon which facilitates the implementation of the developments of the method according to the disclosure.

BRIEF DESCRIPTION OF THE DRAWINGS

The disclosure will now be described with reference to the drawings wherein.

DESCRIPTION OF EXEMPLARY EMBODIMENTS

Figure 1:
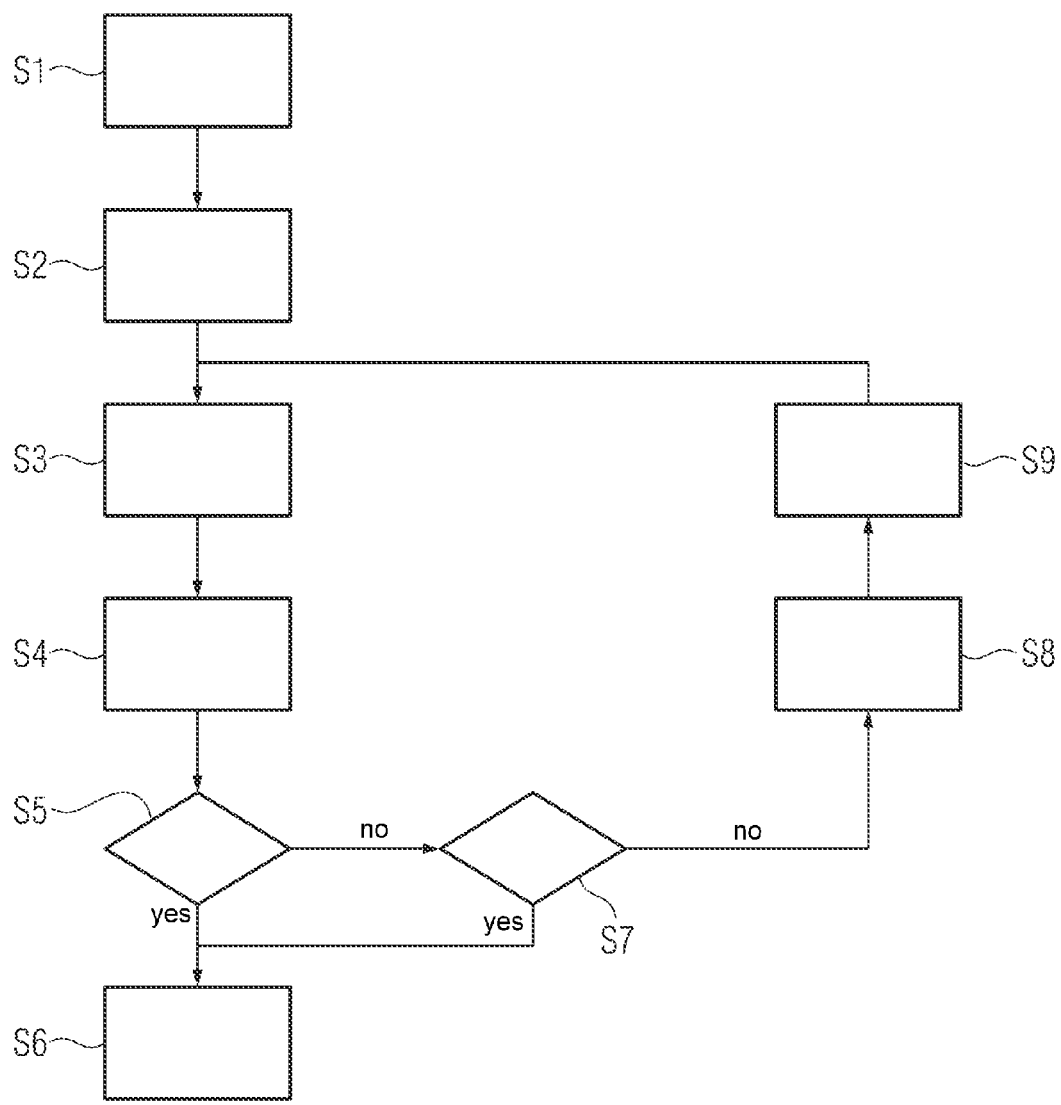
FIG. 1 shows a first exemplary embodiment for the method for determining a spectacle lens that has been fitted to the frame edge curve of a spectacle frame.

The following definitions are used in the following description of exemplary embodiments of the disclosure and in the general description of the disclosure:

Spectacle Frame

An apparatus that is designed to hold a spectacle lens and to be worn on the head in such a way that the spectacle lens is located in front of the eye.

Spectacle Lens Surface

A spectacle lens surface is a surface provided for gazing through the spectacle lens.

Spectacle Lens Back Surface

The spectacle lens back surface is the spectacle lens surface which faces the eye or is closest to the eye when a spectacle lens is used as intended.

Spectacle Lens Front Surface

The spectacle lens front surface is the spectacle lens surface which faces away from the eye or is furthest away from the eye when a spectacle lens is used as intended.

Dioptric Power

Spectacle lenses have at least one dioptric power, the term "dioptric power" being a collective term for the focusing power and the prismatic power (DIN ISO 13666: 2013-10, section 10.9). The term "focusing power" is again a collective term for the spherical power of the spectacle lens, according to which a paraxial, parallel bundle of rays is focused on one point, and the astigmatic power of the spectacle lens, according to which a paraxial, parallel bundle of rays is focused on two mutually perpendicular lines. In the context of the present description, a bundle of rays should be considered to be a paraxial bundle of rays if its diameter does not exceed 0.05 mm, in particular 0.01 mm.

Curve

The term curve describes the bending of the shape of the spectacle lens frame. The curve can be considered to be the curvature of that spherical surface for which there is the smallest deviation of the three-dimensional frame edge curve from the spherical surface, that is to say the curvature of the spherical surface best fitted to the frame edge curve.

Frame Edge Curve

The frame edge curve of a spectacle frame is a three-dimensional curve that depends on the geometry of the spectacle frame and that determines the shape a spectacle lens must have so that it can be held by the spectacle frame. In this case, the frame edge curve may describe, in particular, the edge of the spectacle frame at its front side or the curve of the frame groove, the frame groove being a groove in the interior edge of the spectacle frame that is formed to receive a bevel at the edge of the spectacle lens.

Surface Power

The surface power is a measure for the ability of a surface section surrounding a surface point to change the vergence (refractive index of the spectacle lens material divided by the radius of curvature of the wavefront) of a bundle of rays incident on the surface section from the air (DIN ISO 13666:2013-10, section 9.4).

Free-Form Surface

A free-form surface is understood in the broader sense to be a complex surface that can be represented in particular by means of regionally defined functions, in particular twice continuously differentiable regionally defined functions. Examples of suitable regionally defined functions are (in particular piecewise) polynomial functions (in particular polynomial splines such as bicubic splines, higher order splines of fourth order or higher, Zernike polynomials, Forbes surfaces, Chebyshev polynomials, or polynomial non-uniform rational B-splines (NURBS)) or Fourier series. These should be distinguished from simple surfaces such as, for example, spherical surfaces, aspherical surfaces, cylindrical surfaces, toroidal surfaces or else the surfaces described on page 12, lines 6-13 of WO 89/04986 A1, which are described as circles, at least along a principal meridian. A free-form surface in the narrower sense, corresponding to section 2.1.2 of the DIN SPEC 58194, dated December 2015, is a spectacle lens surface manufactured using free-form technology, which is described mathematically within the limits of differential geometry, and which is neither point symmetric nor axially symmetric.

Free-Form Surface Edge Curve

The free-form surface edge curve is the curve laterally delimiting a free-form surface.

Difference Edge Curve

In the context of the present description, the difference edge curve is a curve which at each point represents a sagittal height difference between the sagittal height of the free-form surface edge curve and the sagittal height of the frame edge curve relative to a reference plane. In this case, it is typical if the projection of the free-form surface edge curve corresponds with the projection of the frame edge curve on a suitable reference plane such that the sagittal height difference of both curves can be formed in relation to this reference plane.

Use Conditions

The term "use conditions" denotes the position and the orientation of the spectacles in relation to the eyes and the face of the wearer while the spectacles are worn. By way of example, the use conditions can be specified by the "as-worn" pantoscopic angle (DIN ISO 13666:2013-10, section 5.18), the face form angle (DIN ISO 13666:2013-10, section 17.3) and the vertex distance (DIN ISO 13666:2013-10, section 5.27) and are matched to the respective wearer for each spectacle lens. Typical values for the "as-worn" pantoscopic angle lie between −20 degrees and +30 degrees; typical values for the vertex distance lie in the range between 5 mm and 30 mm; and typical values for the face form angle lie in the range between −5 degrees and +30 degrees. In addition to the "as worn" pantoscopic angle, the face form angle and the vertex distance, the use conditions, as a rule, also include the interpupillary distance pursuant to DIN ISO 13666:2013-10, section 5.29, i.e., the distance between the centers of the pupils when the eyes are fixating an object at an infinite distance in the straight-ahead position, the centration data, i.e., the dimensions and distances required to center the spectacle lens in front of the eye, and the object distance model, which sets the object distance for which a certain point on the spectacle lens surface is optimized. The use conditions can be individual use conditions, that is to say they are matched to a specific wearer, or general use conditions, that is to say they are matched to a defined group of wearers.

Base Curve

Pursuant to DIN ISO 13666:2013-10, section 11.4.2, the base curve specifies the nominal surface power (or the nominal curvature) of the finished spectacle lens surface of a spectacle lens semi-finished product, also referred to as a spectacle lens blank, or a finished spectacle lens. Often, this finished spectacle lens surface is the spectacle lens front surface.

Optimization/Iterative Optimization

Optimization refers to the fitting of parameters of a system such that a given target function that depends on the parameters at least approximately obtains a maximum or a minimum. An iterative optimization is a method for optimizing parameters using computational procedures that repeat step-by-step.

Sagittal Height

The sagittal height of a point on a lens surface is a measure for the distance of this point from a reference plane extending through a reference point of the lens surface. By way of example, it can be specified by the distance of a plane that runs through the point and is parallel to the reference plane from the reference plane.

Plane of the Lens Shape

The plane of the lens shape refers to a plane tangential to the front surface of a plano or demonstration or dummy lens at its boxed center, when mounted in the spectacle frame (DIN ISO 13666:2013-10, section 17.1).

Spherical Surface/Aspherical Surface

A spherical surface is considered to be a surface which is part of an inside or outside surface of a sphere (DIN ISO 13666:2013-10, section 7.1). By contrast, an aspherical surface is a surface of revolution of a continuously variable curvature from the vertex to the periphery (DIN ISO 13666:2013-10, section 7.3).

TABO Scheme

The TABO (Technischer Ausschuss für Brillenoptik—[Technical Committee for Spectacle Optics]) scheme is a scheme which finds use, inter alia, for uniquely specifying the axes for cylindrical or prismatic corrections. In the TABO scheme, the assumption is made that an observer is opposite the spectacle wearer. It comprises two circles with markings running counterclockwise from 0 to 360 degrees, with the 0 degrees direction or the 360 degrees direction being horizontal to the right such that the 0 degrees direction or the 360 degrees direction is temporal in relation to the left eye and nasal in relation to the right eye.

Toric Surface/Atoric Surface

A toric surface is a surface which has two mutually perpendicular principal sections of differing curvature, the cross sections in both principal sections being nominally circular (DIN ISO 13666:2013-10, section 7.5). An atoric surface is a surface which has two mutually perpendicular principal sections of differing curvature and of which the cross section in at least one of the principal sections is not circular (DIN ISO 13666:2013-10, section 7.6).

Overlaying Surfaces

Overlaying surfaces refers to a method for modifying a first surface by a second surface. In a Cartesian coordinate system, overlaying can be implemented, for example, by adding the z-components of the surface coordinates at points of the respective surfaces having the same x- and y-coordinates.

Variational Methods

A variational method is a method for finding an approximate solution to a mathematical problem such as, for instance, an optimization problem in which initial values for parameters are varied until a specified variable satisfies a specified conditions, for example reaches a minimum or maximum.

Prescription

The term "prescription" denotes a summary in which the dioptric powers necessary for correcting a diagnosed refractive error are specified in the form of suitable values. In the case of spherical power, the prescription may contain a value "sph" for sphere. In the case of astigmatic power, the prescription can contain values "cyl" for cylinder and "axis" for axis, and, in the case of prismatic power, the prescription can contain a prism value. Moreover, the prescription may contain further values, for example the "add" value in the case of multifocal spectacle lenses, the "add" value specifying the difference between the vertex power in the near portion of the spectacle lens and in the distance portion of the spectacle lens. A value "PD" for the interpupillary distance may also be contained in the prescription. Synonyms for a "prescription" are "eyeglass prescription" and "lens prescription."

Target Design

A target design within the meaning of the present disclosure is the prescription of a distribution of image aberrations over the spectacle lens or of surface properties of the spectacle lens, which should be achieved in an optimization process. In the first case, reference is made to an optical target design and reference is made to a surface target design in the second case. Accordingly, an optical target design is the prescription of a distribution of image aberrations over the entire spectacle lens or else, therebeyond, in the spectacle wearer beam path (e.g., astigmatic residual deviation, spherical residual deviation, prism, horizontal symmetry, distortion, or el se higher order aberrations such as, e.g., coma). Additionally, the optical target design may also contain prescriptions for the astigmatic and spherical residual deviations at reference points (e.g., distance design reference point or near design reference point) or the addition power in the measurement beam path of a measuring device, e.g., in the beam path of a vertex power measuring device. By contrast, a surface target design specifies surface properties of the free-form surface to be formed that should be achieved in the optimization process, for example a surface power and a surface astigmatism. Here, the surface power is a measure for the ability of a surface section surrounding an optimization point to change the vergence (refractive index of the spectacle lens material divided by the radius of curvature of the wavefront) of a bundle of rays incident on the surface section from the air. The surface astigmatism at an optimization point represents the difference of the surface powers in the principal meridians at an optimization point of the surface.

A first exemplary embodiment for the computer-implemented method according to the disclosure for determining a spectacle lens fitted to the frame edge curve of a spectacle frame is described below with reference to FIG. 1. In this case, the method serves to determine a spectacle lens that has been fitted to the frame edge curve, at least on the basis of data from a given prescription and a given frame shape with a certain frame edge curve. Optionally, data relating to use and thickness conditions and/or given centration data and/or a given target design may also be added to the data from the prescription and the frame shape.

A mean curvature for a first spectacle lens surface is specified at the start of the method in step S1. This first spectacle lens surface is the spectacle lens front surface in the present exemplary embodiment. The curvature specification is usually given at a reference point of the spectacle lens front surface. By way of example, the mean curvature of the spectacle lens front surface can be specified by specifying a base curve of the spectacle lens front surface. In this case, the curvature specification for the first spectacle lens surface can be derived, in particular, from the curve of the frame. In particular, the base curve can be chosen such that the mean curvature of the spectacle lens front surface is the curvature of the spherical surface with the best fit to the frame edge curve. The spectacle lens with the specified mean curvature then serves as initial spectacle lens for the subsequent steps.

Following the specification of the curvature for the spectacle lens front surface in step S1, a toric spectacle lens back surface of the initial spectacle lens is calculated in step S2, in such a way that the dioptric power according to the prescription is approximately attained by the spectacle lens. Even though reference here and below is only made to one dioptric power, a person skilled in the art recognizes that a plurality of dioptric powers may optionally also be attained by means of the spectacle lens, for example a near vision dioptric power and a distance vision dioptric power. If the description of the disclosure refers to an intended dioptric power of the spectacle lens, this should therefore also encompass cases in which there are a plurality of intended dioptric powers of the spectacle lens. In this case, the use conditions of the pair of spectacles, in particular individual use conditions of the pair of spectacles, may be taken into account. Taking into account the use conditions allows the spectacle lenses to be fit particularly well to the spectacle wearer.

Then, in step S3, a free-form surface for the spectacle lens front surface is optimized proceeding from a spectacle lens with a spectacle lens front surface having the curvature specified in step S1 and the toric spectacle lens back surface calculated in step S2. In this case, the optimization is implemented in view of attaining the intended dioptric power of the spectacle lens and, corresponding to an optical target design for the entire spectacle lens, possible thickness specifications for the spectacle lens and while taking account of the centration data. In this case, too, the use conditions of the pair of spectacles, in particular individual use conditions of the pair of spectacles, may be taken into account again. Optionally, demands in respect of the edge deviation in relation to the frame edge may also additionally be included in this optimization (but these generally oppose the dioptric requirements).

Attention is drawn to the fact that the method may also be started directly with any specified toric back surface in step S2, without taking account of a specification for the mean curvature of the spectacle lens front surface, and may then continue with step S3. However, this procedure may lead to an iteration method with more iteration steps than in a method in which the above-described steps S1 and S2 are carried out.

For the optimization, the spectacle lens front surface is described with the aid of parameterized, regionally defined functions. Moreover, provided are a target design, which is an optical target design in the present exemplary embodiment and consequently represents a distribution of image aberrations, and a target function, the value of which depends on the deviation of the distribution of image aberrations attained by the spectacle lens from the distribution specified in the target design. In this case, the value of the target function represents a measure for how accurately the distribution specified in the target design is attained. The parameter values of the regionally defined functions are varied within the scope of the optimization until the value of the target function satisfies a termination condition which leads to the termination of the variation of the parameter values. Determining the distribution of image aberrations attained by the spectacle lens is implemented here by means of ray calculation, which calculates the image aberrations for the spectacle wearer beam path or for the beam path in a measuring device at specified optimization points of the spectacle lens. The ray calculation for the spectacle wearer beam path calculates the values for the image aberration at the individual optimization points, in each case for a bundle of rays whose chief ray extends through the optimization point and through the fulcrum of the eye, i.e., the point about which the eye rotates in the case of viewing movements. The ray calculation for the beam path in the measuring device calculates the measurement values to be measured by the measuring device at the individual optimization points, in each case for a bundle of rays which extends through the optimization point in accordance with the beam path provided in the employed measuring device for the measurement at this optimization point. Examples of methods for optimizing spectacle lenses are described in DE 10 2012 000 390 A1 and in WO 2008/089999 A1. Reference is made to these documents in respect of further details of the optimization. Rather than carrying out the optimization with the aid of an optical target design like in the exemplary embodiment, the optimization may also be carried out with the aid of a surface target design.

Using the spectacle lens optimized thus, a difference edge curve is then determined in step S4, the latter representing, for each point of the free-form surface edge curve or for a number of selected points on the free-form surface edge curve, the sagittal height difference between their sagittal heights and the sagittal height of the frame edge curve at the corresponding points.

Then, the maximum sagittal height difference present in the difference edge curve is determined in step S5 as a measure for the deviation of the free-form surface edge curve present following the optimization of the free-form surface from the frame edge curve, and a check is carried out whether the maximum sagittal height difference present in the difference edge curve is below a given limit. Should this be the case, the method proceeds to step S6, in which the geometry of the spectacle lens with the previously determined spectacle lens back surface and the spectacle lens front surface provided with the optimized free-form surface, including measurement and manufacturing data, is output as the spectacle lens fitted to the frame edge curve.

Should the maximum sagittal height difference present in the difference edge curve be found not to be below the specified limit in step S5, the method proceeds to step S7, in which a check is carried out whether the maximum change in the sagittal height differences present in the difference edge curve from the sagittal height differences present in the preceding difference edge curve is below a specified limit. Should this be the case, the method likewise proceeds to step S6. Otherwise, the method proceeds to step S8, in which a toric surface is fitted to the difference edge curve determined in step S4. The method then proceeds to step S9.

The toric spectacle lens back surface is modified in step S9. In the present exemplary embodiment the toric spectacle lens back surface is modified by virtue of a new toric spectacle lens back surface being formed by overlaying the toric surface determined in step S8, or a portion of this toric surface, on the previous toric spectacle lens back surface. Then, the method proceeds to step S3 in which the free-form surface on the spectacle lens front surface is re-optimized, the toric spectacle lens back surface now being formed by the toric spectacle lens back surface that was modified in step S9.

Steps S3, S4, S5, S7, S8, and S9 are repeated until the maximum sagittal height difference contained in the difference edge curve is determined in step S5 as no longer exceeding the specified limit or until the maximum change in the sagittal height differences present in the difference edge curve from the sagittal height differences present in the preceding difference edge curve is determined in step S7 as dropping below the limit provided to this end. The method may optionally also register the number of implemented iterations and the method may be terminated without a result after a specified maximum number of iterations has been reached. In this case, the method may be carried out again, optionally with a different specified curvature of the spectacle lens front surface.

In the method of the first exemplary embodiment, there is, with the aid of the iterative optimization of the second spectacle lens surface and the free-form surface, that is to say the free-form surface formed on the spectacle lens front surface and the toric spectacle lens back surface in the present exemplary embodiment, a simultaneous optimization of both the free-form surface and also the second spectacle lens surface in view of minimizing the difference between the free-form surface edge curve and the frame edge curve and in respect of attaining the intended dioptric power of the spectacle lens. In this case, the second spectacle lens surface is modified proceeding from a spectacle lens which has the previously optimized free-form surface and the previously present second spectacle lens surface, and the free-form surface is subsequently optimized in view of attaining the intended dioptric power of the spectacle lens. In this case, the number of iterations can equal one if the second spectacle lens surface determined at the start of the method and the free-form surface that was optimized at the start of the method already lead to a sufficiently accurate fit of the free-form surface edge curve to the frame edge curve, that is to say a fit in which the measure for the deviation of the free-form surface edge curve present following the optimization of the free-form surface from the frame edge curve is not exceeded and, moreover, the demanded dioptric power is attained sufficiently accurately.

Instead of a single limit, a limit curve which defines different limits for different regions of the free-form surface edge curve may also be used in step S5. In an extreme case, a separate limit may be defined for each point of the free-form surface edge curve. As a result, it is possible to reduce the requirements in relation to other regions of the spectacle lens in regions of the spectacle lens where larger deviations from the frame edge curve can be accepted.

Figure 2:
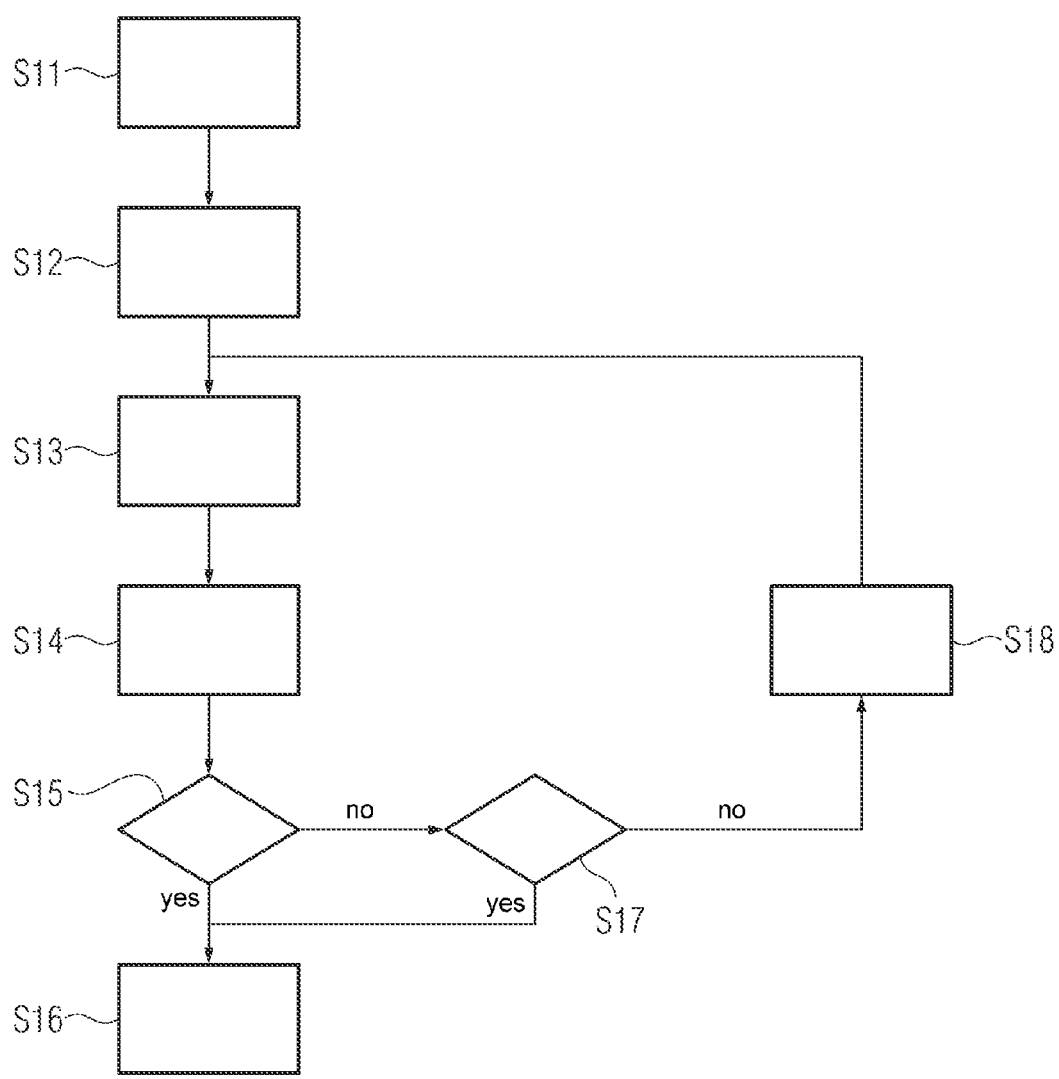
FIG. 2 shows a second exemplary embodiment for the method for determining a spectacle lens that has been fitted to the frame edge curve of a spectacle frame.

A second exemplary embodiment for the computer-implemented method according to the disclosure for determining a spectacle lens fitted to the frame edge curve of a spectacle frame is described below with reference to FIG. 2.

Like in the first exemplary embodiment, a curvature for a first spectacle lens surface, which is also the spectacle lens front surface in the second exemplary embodiment, is also specified (step S11) in the second exemplary embodiment and a second spectacle lens surface is determined in view of the intended dioptric power of the spectacle lens according to the prescription for an initial spectacle lens which has the first spectacle lens surface with the specified curvature (step S12). The second spectacle lens surface also is the spectacle lens back surface in the second exemplary embodiment. Then, a free-form surface on the spectacle lens front surface is optimized in step S13 in view of attaining the intended dioptric power of the spectacle lens. Steps S11, S12 and S13 do not differ from steps S1, S2 and S3 of the first exemplary embodiment. Like in the first exemplary embodiment, there is the option of starting directly with any given toric back surface in step S12 and then proceeding with step S13.

In contrast to step S4 of the first exemplary embodiment, however, the Euclidean norm is taken in step S14 of the second exemplary embodiment as a measure for the deviation of the free-form surface edge curve from the frame edge curve for the spectacle lens with the previously determined toric back surface and the optimized free-form surface, by virtue of forming and summing the squares of the sagittal height differences obtained in the difference edge curve, generally at selected edge points, and subsequently taking the root of the summation. After calculating the Euclidean norm of the difference edge curve in step S14, the method proceeds to step S15 where a check is carried out as to whether the Euclidean norm determined in step S14 is below a given limit. Should this be the case, the method proceeds from step S15 to step S16 and outputs the geometry of the spectacle lens with the toric back surface determined in step S12 and the free-form surface optimized in step S13, including measurement and manufacturing data, as the spectacle lens fitted to the frame edge curve.

Should the value of the Euclidean norm of the difference edge curve be determined not to be below the specified limit in step S15, the method proceeds to step S17. There, a check is carried out whether the difference between the calculated value of the Euclidean norm of the difference edge curve and the value of the Euclidean norm of the difference edge curve calculated in the preceding iteration step is below a specified limit. Should this be the case, the method likewise proceeds to step S16 and outputs the spectacle lens with the previously calculated toric back surface and the previously optimized free-form surface as the spectacle lens fitted to the frame edge curve.

Should the difference between the calculated value of the Euclidean norm of the difference edge curve and the value of the Euclidean norm of the difference edge curve calculated in the preceding iteration step be found in step S17 not to be below the specified limit, the method proceeds to step S18. In this step, the toric spectacle lens back surface is modified with the aid of a variational method. In this case, the "radii" and "axis" parameters of the toric back surface are varied with the aid of a suitable mathematical minimization method in order to determine a new toric back surface. A target function that is minimized by varying the parameters is specified in such a minimization method. In this case, the target function is the value of the Euclidean norm of the difference edge curve again, which may be calculated for each spectacle lens back surface after the respective optimization of the spectacle lens front surface that is in the form of a free-form surface, that is to say this variation then is an overarching optimization for minimizing the Euclidean norm of the difference edge curve.

After a modified toric spectacle lens back surface has been determined in step S18 with the aid of a variational method, the method proceeds to step S13. Steps S13, S14, S15, S17 and S18 are iteratively repeated until the Euclidean norm of the difference edge curve is determined in step S15 as dropping below the specified limit or the difference between the calculated value of the Euclidean norm of the difference edge curve and the value of the Euclidean norm of the difference edge curve calculated in the preceding iteration step is determined in step S17 as dropping below the limit specified to this end. Like in the first exemplary embodiment, the second exemplary embodiment also envisages the option of providing a maximum number of iterations, the method being terminated without success once this number has been reached. In this case there is also the option of carrying out the method again using a different specified curvature for the first spectacle lens surface.

In the second exemplary embodiment, like in the first exemplary embodiment, there also is, with the aid of the iterative optimization of the second spectacle lens surface and the free-form surface, that is to say the free-form surface formed on the spectacle lens front surface and the toric spectacle lens back surface in the present exemplary embodiment, a simultaneous optimization of both the free-form surface and also the second spectacle lens surface in view of minimizing the difference between the free-form surface edge curve and the frame edge curve and in respect of attaining the intended dioptric power of the spectacle lens.

In all exemplary embodiments, the toric spectacle lens back surface can be modified (step S9 in the first exemplary embodiment and in step S18 in the second exemplary embodiment) under the boundary condition that the mean surface power of the toric spectacle lens back surface remains constant so that the mean curvature of the spectacle lens front surface therefore does not change, or only changes within certain boundaries, at the reference point of the spectacle lens.

Boundary conditions for the sagittal height differences of the free-form surface edge curve from the frame edge curve can be specified during the optimization of the free-form surface on the spectacle lens front surface in all exemplary embodiments of the disclosure. However, such boundary conditions may impair the optical quality for the spectacle wearer when gazing through the peripheral regions of the spectacle lens fitted to the frame edge curve, and therefore are typically avoided.

By measuring the three-dimensional frame edge curve during the centration of the frame (within which the frame is fitted without corrective lenses prior to the order of the spectacle lens) and taking account of the measured frame edge curve, the edging of the spectacle lens, in particular also the profile of the bevel at the edge of the spectacle lens, can be designed in accordance with the measured frame edge curve with the aid of the computer-implemented method according to the disclosure, and so, following the insertion of the spectacle lens into the frame, the frame shape precisely corresponds to the shape measured during the centration of the frame so that the measured centration data remain valid. What this can prevent is that, following the insertion of the spectacle lenses, the frame experiences a deformation in relation to its shape during the centration, that is to say when worn without corrective lenses. At the same time, the edge profile of the spectacle lens then also corresponds to the frame edge when the finished spectacles are worn. Should the three-dimensional frame edge curve be acquired by a measurement of the unworn frame instead of a measurement during the centration, the method according to the disclosure may also be carried out with a slightly corrected three-dimensional frame edge curve, the correction taking account of the deformation of the frame when worn.

The extent to which the deviation of the free-form surface edge curve from the frame edge curve can be reduced using the method according to the disclosure is shown below for a spectacle frame on the basis of the specific exemplary embodiment. To this end, Table 1 specifies the frame edge curve in Cartesian coordinates for angles between 10 and 360°. Table 2 shows the sagittal height difference between the free-form surface edge curve and the frame edge curve of a conventional spectacle lens for the respective angles, and Table 3 shows the sagittal height difference between the free-form surface edge curve and the frame edge curve for a spectacle lens that has been fitted to the frame edge curve of the spectacle frame with the aid of the method according to the disclosure.

Table 1 describes the coordinates of the frame edge curve for angles using the TABO scheme in Cartesian coordinates. The x-coordinate and y-coordinate are within the plane of the lens shape of the frame, the z-direction being perpendicular to the plane of the lens shape against the direction of light. In the Table, the angles are specified in degrees and the x, y and z coordinates are specified in millimeters.

TABLE 1

| Angle | x | y | z |
|---|---|---|---|
| 10.0 | 24.5217 | 4.3238 | 0.0000 |
| 20.0 | 22.2707 | 8.1059 | 0.4125 |
| 30.0 | 18.6195 | 10.7500 | 1.2928 |
| 40.0 | 14.3250 | 12.0201 | 2.3429 |
| 50.0 | 10.2203 | 12.1801 | 3.2723 |
| 60.0 | 7.1000 | 12.2976 | 3.7943 |
| 70.0 | 4.5489 | 12.4979 | 4.0827 |
| 80.0 | 2.2053 | 12.5071 | 4.2950 |
| 90.0 | 0.0000 | 12.5000 | 4.4197 |
| 100.0 | −2.2053 | 12.5071 | 4.4659 |
| 110.0 | −4.5489 | 12.4979 | 4.4361 |
| 120.0 | −7.1000 | 12.2976 | 4.3474 |
| 130.0 | −10.4132 | 12.4099 | 4.0009 |
| 140.0 | −14.4016 | 12.0844 | 3.4516 |
| 150.0 | −19.3990 | 11.2000 | 2.4954 |
| 160.0 | −25.4657 | 9.2687 | 0.9149 |
| 170.0 | −29.0518 | 5.1226 | 0.1077 |
| 180.0 | −30.0000 | 0.0000 | 0.1875 |
| 190.0 | −29.9382 | −5.2789 | 0.3738 |
| 200.0 | −29.5063 | −10.7394 | 0.3458 |
| 210.0 | −28.0592 | −16.2000 | 0.3627 |
| 220.0 | −23.9772 | −20.1193 | 1.2717 |
| 230.0 | −18.3837 | −21.9089 | 2.5995 |
| 240.0 | −12.9500 | −22.4301 | 3.6266 |
| 250.0 | −8.1743 | −22.4587 | 4.2259 |
| 260.0 | −3.9592 | −22.4536 | 4.4618 |
| 270.0 | −0.0000 | −22.5000 | 4.4197 |
| 280.0 | 3.9418 | −22.3551 | 4.1753 |
| 290.0 | 7.7639 | −21.3310 | 3.8876 |
| 300.0 | 11.6500 | −20.1784 | 3.3648 |
| 310.0 | 15.1055 | −18.0020 | 2.8778 |
| 320.0 | 17.9254 | −15.0412 | 2.4526 |
| 330.0 | 20.3516 | −11.7500 | 1.9614 |
| 340.0 | 22.1767 | −8.0717 | 1.4930 |
| 350.0 | 24.0293 | −4.2370 | 0.7772 |
| 360.0 | 25.0000 | 0.0000 | 0.1875 |

Table 2 describes the difference edge curve of a spectacle lens, produced according to the prior art and comprising a spherical back surface having a radius of curvature of r=167 mm. The spectacle lens front surface is in the form of a free-form surface and optimized for minimal astigmatic and spherical aberrations for the spectacle wearer in accordance with a specified optical target design. The spectacle lens underlying the difference edge curve of Table 2 is an optimized right single vision spectacle lens, with a spherical corrective effect of 2.0 diopters, a refractive index of 1.501, a frame length of 55 mm, a frame height of 35 mm, a horizontal centration point distance of 25 mm, a vertical centration point distance of 22.5 mm, a pantoscopic angle of 0° and a face form angle of 0°.

TABLE 2

| Angle | z-difference |
|---|---|
| 10.0 | 1.9452 |
| 20.0 | 1.6880 |
| 30.0 | 1.2609 |
| 40.0 | 0.8141 |
| 50.0 | 0.4596 |
| 60.0 | 0.2617 |
| 70.0 | 0.1473 |
| 80.0 | 0.0676 |
| 90.0 | 0.0201 |
| 100.0 | 0.0000 |
| 110.0 | 0.0073 |
| 120.0 | 0.0423 |
| 130.0 | 0.1589 |
| 140.0 | 0.3676 |
| 150.0 | 0.7550 |
| 160.0 | 1.4373 |
| 170.0 | 1.8792 |
| 180.0 | 1.9387 |
| 190.0 | 1.9027 |
| 200.0 | 1.8978 |
| 210.0 | 1.8139 |
| 220.0 | 1.3416 |
| 230.0 | 0.7487 |
| 240.0 | 0.3265 |
| 250.0 | 0.0943 |
| 260.0 | 0.0052 |
| 270.0 | 0.0201 |
| 280.0 | 0.1180 |
| 290.0 | 0.2617 |
| 300.0 | 0.4983 |
| 310.0 | 0.7479 |
| 320.0 | 0.9808 |
| 330.0 | 1.2263 |
| 340.0 | 1.4438 |
| 350.0 | 1.7327 |
| 360.0 | 1.9387 |

As may be gathered from Table 2, the sagittal height differences (z-difference) which correspond to the difference in the z-coordinates in the coordinate system of Table 1 range between a minimal deviation of 0 at 100° and a maximum deviation of virtually 1.95 at 10°. This means that the edge of the spectacle lens front surface protrudes beyond the frame edge by up to approximately 1.9 mm. The Euclidean norm of the difference edge curve specified in Table 2 has a value of 6.67.

Table 3 shows the sagittal heights of the difference edge curve of a spectacle lens fitted to the spectacle frame with the aid of the method according to the disclosure. Herein, the spherical spectacle lens back surface has been replaced by a toric spectacle lens back surface. A toric spectacle lens back surface was determined with the aid of the optimization according to the disclosure, the axis of the spectacle lens back surface having a value of 90.9° (TABO) and the radius therein being 135.772 mm within the first principal meridian corresponding to the axis and being 91.09 mm in a second principal meridian running perpendicular to this first principal meridian. Within the scope of the described iteration, the free-form surface on the spectacle lens front surface was optimized after each modification of the toric spectacle lens back surface.

TABLE 3

| Angle | z-difference |
|---|---|
| 10.0 | 0.0451 |
| 20.0 | 0.0631 |
| 30.0 | 0.0682 |
| 40.0 | 0.0556 |
| 50.0 | 0.0337 |
| 60.0 | 0.0212 |
| 70.0 | 0.0155 |
| 80.0 | 0.0097 |
| 90.0 | 0.0062 |
| 100.0 | 0.0048 |
| 110.0 | 0.0054 |
| 120.0 | 0.0057 |
| 130.0 | 0.0166 |
| 140.0 | 0.0290 |
| 150.0 | 0.0483 |
| 160.0 | 0.0797 |
| 170.0 | 0.0643 |
| 180.0 | 0.0237 |
| 190.0 | 0.0051 |
| 200.0 | 0.0218 |
| 210.0 | 0.0674 |
| 220.0 | 0.0790 |
| 230.0 | 0.0542 |
| 240.0 | 0.0251 |
| 250.0 | 0.0053 |
| 260.0 | 0.0000 |
| 270.0 | 0.0062 |
| 280.0 | 0.0179 |
| 290.0 | 0.0202 |
| 300.0 | 0.0295 |
| 310.0 | 0.0271 |
| 320.0 | 0.0175 |
| 330.0 | 0.0094 |
| 340.0 | 0.0027 |
| 350.0 | 0.0092 |
| 360.0 | 0.0237 |

As may be gathered from Table 3, the maximum sagittal height (z-difference) of the difference edge curve has a value of not quite 0.08 at 160°. Expressed differently, the edge of the spectacle lens does not project by more than 0.08 mm beyond the frame edge at any point of the frame. The Euclidean norm of the difference edge curve specified in Table 3 has a value of 0.22. Consequently, the latter is smaller than the value of the Euclidean norm of the difference edge curve of Table 2 by more than one order of magnitude. Consequently, the edge profile of the spectacle lens can hardly still be distinguished from the edge profile of the frame.

The optical quality of the spectacle lens optimized according to the method according to the disclosure from Table 3 does not differ substantially from the optical quality of the spectacle lens that forms the basis of Table 2.

The method according to the disclosure can be carried out on a computer with the aid of an appropriate computer program. Such a computer program comprises instructions which, when they are executed on a computer, cause the computer to carry out the method according to the disclosure. It may be stored on a non-volatile computer-readable storage medium such as a disk, a CD, a DVD, a USB stick, etc. or else be able to be called from a network, for instance the Internet or a local area network (LAN).

Instead of on a computer, the method according to the disclosure may also be implemented on a data processing system specifically configured to this end. An appropriately designed computer program may also find use to this end.

The present disclosure has been described in detail on the basis of exemplary embodiments for explanatory purposes. However, a person skilled in the art recognizes that there may be deviations from the described exemplary embodiments within the scope of the present disclosure. By way of example, the free-form surface could be formed on the spectacle lens back surface and the toric surface could be formed on the spectacle lens front surface in alternative embodiments. Likewise, there is the option of using an atoric surface, a spherical surface or an aspherical surface instead of a toric surface. Therefore, the present disclosure is not intended to be limited by the exemplary embodiments but rather only by the appended claims.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents, and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE SIGNS

S1 Specifying a mean curvature
S2 Determining the spectacle lens back surface
S3 Optimizing a free-form surface on the spectacle lens front surface
S4 Determining the difference edge curve
S5 Checking whether the sagittal height differences drop below a specified limit
S6 Outputting the data of the fitted spectacle lens
S7 Checking whether the improvement drops below a specified limit
S8 Fitting a torus to the difference edge curve
S9 Overlaying the torus fitted in S8 on the previously determined toric spectacle lens back surface
S11 Specifying a mean curvature for the spectacle lens front surface
S12 Calculating a toric spectacle lens back surface
S13 Optimizing a free-form surface on the spectacle lens front surface
S14 Calculating the norm of the difference edge curve
S15 Checking whether the norm of the difference edge curve drops below a limit
S16 Outputting the data of the fitted spectacle lens
S17 Checking whether the improvement of the norm drops below a specified limit
S18 Varying the parameters of the spectacle lens back surface

The invention claimed is:

1. A computer-implemented method for fitting a spectacle lens having a first spectacle lens surface, a second spectacle lens surface, and at least one intended dioptric power to a spectacle frame having a predetermined frame edge curve, the method comprising:
    fitting a free-form surface formed on the first spectacle lens surface to the frame edge curve of the spectacle frame, wherein the free-form surface is fitted to the frame edge curve by simultaneously optimizing the free-form surface and the second spectacle lens surface with regard to minimizing a difference between the free-form surface edge curve and the frame edge curve and with regard to attaining the at least one intended dioptric power of the spectacle lens, the free-form surface and the second spectacle lens surface mutually influencing one another during the optimization, wherein the simultaneous optimization of the free-form surface and the second spectacle lens surface is implemented iteratively, the second spectacle lens surface being altered first in each iteration step and the free-form surface then being optimized with regard to attaining the at least one intended dioptric power of the spectacle lens, wherein in each iteration step the optimization of the free-form surface is followed by a determination of a measure for a deviation of the free-form surface edge curve present after the optimization of the free-form surface from the frame edge curve; and terminating the method if the measure for the deviation is less than a given value or a change in the measure is less than a given value, or, otherwise, in a subsequent iteration step:

modifying the second spectacle lens surface; and subsequently optimizing the free-form surface again with regard to attaining the at least one intended dioptric power of the spectacle lens.

2. The computer-implemented method as claimed in claim 1, wherein the second spectacle lens surface is a spherical spectacle lens surface, an aspherical spectacle lens surface, a toric spectacle lens surface, or an atoric spectacle lens surface.

3. The computer-implemented method as claimed in claim 1, wherein an initial spectacle lens having a first spectacle lens surface with a specified curvature serves as a starting point for the iterative optimization.

4. The computer-implemented method as claimed in claim 3, wherein the second spectacle lens surface is initially determined in the first iteration step with regard to the at least one intended dioptric power of the spectacle lens and the free-form surface is then optimized with regard to attaining the at least one intended dioptric power of the spectacle lens.

5. The computer-implemented method as claimed in claim 1, wherein the measure for the deviation is based on a difference edge curve that represents a difference in sagittal heights of the free-form surface edge curve and of the frame edge curve at mutually equivalent points of the two edge curves relative to a reference plane, and wherein the second spectacle lens surface is modified based on the difference edge curve.

6. The computer-implemented method as claimed in claim 5, wherein the second spectacle lens surface is modified by fitting a third spectacle lens surface to the difference edge curve, and overlaying at least one portion of the third spectacle lens surface on the second spectacle lens surface.

7. The computer-implemented method as claimed in claim 1, wherein a mean surface power of the second spectacle lens surface remains constant when the second spectacle lens surface is modified.

8. The computer-implemented method as claimed in claim 1, wherein the first spectacle lens surface is the spectacle lens front surface and the second spectacle lens surface is the spectacle lens back surface.

9. A computer program for fitting a spectacle lens having a first spectacle lens surface, a second spectacle lens surface, and at least one intended dioptric power to a spectacle frame having a predetermined frame edge curve, the computer program containing instructions which, when executed on a computer, prompt the computer to fit a free-form surface formed on a first spectacle lens surface to the frame edge curve of the spectacle frame, wherein the computer program moreover comprises instructions which, when executed on a computer, prompt the computer to:

simultaneously optimize the free-form surface and the second spectacle lens surface with regard to minimizing a difference between the free-form surface edge curve and the frame edge curve and with regard to attaining the at least one intended dioptric power of the spectacle lens for the purpose of fitting the free-form surface to the frame edge curve, the free-form surface and the second spectacle lens surface mutually influencing one another during the optimization;

perform the simultaneous optimization of the free-form surface and the second spectacle lens surface iteratively, the second spectacle lens surface being altered first in each iteration step and the free-form surface then being optimized with regard to attaining the at least one intended dioptric power of the spectacle lens;

determine in each iteration step after the optimization of the free-form surface a measure for a deviation of the free-form surface edge curve present after the optimization of the free-form surface from the frame edge curve;

terminate the method if the measure for the deviation is less than a given value or a change in the measure is less than the given value, or otherwise, in a subsequent iteration step:

modify the second spectacle lens surface; and subsequently optimize the free-form surface again with regard to attaining the at least one intended dioptric power of the spectacle lens, wherein the measure for the deviation is based on a difference edge curve that represents a difference in sagittal heights of the free-form surface edge curve and of the frame edge curve at mutually equivalent points of the two edge curves relative to a reference plane, wherein the second spectacle lens surface is modified based on the difference edge curve, and wherein the second spectacle lens surface is modified by virtue of a third spectacle lens surface being fitted to the difference edge curve and at least one portion of the third spectacle lens surface being overlaid on the second spectacle lens surface.

10. A data processing system for fitting a spectacle lens having a first spectacle lens surface, a second spectacle lens surface, and at least one intended dioptric power to a spectacle frame having a predetermined frame edge curve, the data processing system comprising a processor and at least one memory and the processor being configured, based on instructions of a computer program stored in the at least one memory, to fit a free-form surface formed on a first spectacle lens surface to the frame edge curve of the spectacle frame, wherein the processor is moreover configured, based on the instructions of the computer program stored in the memory, to:

simultaneously optimize the free-form surface and the second spectacle lens surface with regard to minimizing a difference between the free-form surface edge curve and the frame edge curve and with regard to attaining the at least one intended dioptric power of the spectacle lens for the purpose of fitting the free-form surface to the frame edge curve, the free-form surface and the second spectacle lens surface mutually influencing one another during the optimization;

perform the simultaneous optimization of the free-form surface and the second spectacle lens surface iteratively, the second spectacle lens surface being altered first in each iteration step and the free-form surface then being optimized with regard to attaining the at least one intended dioptric power of the spectacle lens;

determine in each iteration step after the optimization of the free-form surface a measure for a deviation of the free-form surface edge curve present after the optimization of the free-form surface from the frame edge curve and to:

terminate the method if the measure for the deviation is less than a given value or a change in the measure is less than the given value, or otherwise, in a subsequent iteration step, to modify the second spectacle lens surface; and subsequently optimize the free-form surface again with regard to attaining the at least one intended dioptric power of the spectacle lens, wherein the measure for the deviation is based on a difference edge curve that represents a difference in sagittal heights of the free-form surface edge curve and of the frame edge curve at mutually equivalent points of the two edge curves relative to a reference plane, wherein the second spectacle lens surface is modified based on the difference edge curve, and wherein the second spectacle lens surface is modified by virtue of a third spectacle lens surface being fitted to the difference edge curve and at least one portion of the third spectacle lens surface being overlaid on the second spectacle lens surface.

11. A non-transitory computer-readable storage medium with instructions stored thereon for fitting a spectacle lens having a first spectacle lens surface, a second spectacle lens surface, and at least one intended dioptric power to a spectacle frame having a predetermined frame edge curve, the instructions, when executed on a computer, prompting the computer to fit a free-form surface formed on a first spectacle lens surface to the frame edge curve of the spectacle frame, wherein the storage medium moreover comprises instructions stored thereon which, when executed on a computer, prompt the computer to:

simultaneously optimize the free-form surface and the second spectacle lens surface with regard to minimizing a difference between the free-form surface edge curve and the frame edge curve and with regard to attaining the at least one intended dioptric power of the spectacle lens for the purpose of fitting the free-form surface to the frame edge curve, the free-form surface and the second spectacle lens surface mutually influencing one another during the optimization;

perform the simultaneous optimization of the free-form surface and the second spectacle lens surface iteratively, the second spectacle lens surface being altered first in each iteration step and the free-form surface then being optimized with regard to attaining the at least one intended dioptric power of the spectacle lens;

determine in each iteration step after the optimization of the free-form surface a measure for a deviation of the free-form surface edge curve present after the optimization of the free-form surface from the frame edge curve and to:

terminate the method if the measure for the deviation is less than a given value or a change in the measure is less than the given value, or otherwise, in a subsequent iteration step;

modify the second spectacle lens surface; and subsequently optimize the free-form surface again with regard to attaining the at least one intended dioptric power of the spectacle lens, wherein the measure for the deviation is based on a difference edge curve that represents a difference in sagittal heights of the free-form surface edge curve and of the frame edge curve at mutually equivalent points of the two edge curves relative to a reference plane, wherein the second spectacle lens surface is modified based on the difference edge curve, and wherein the second spectacle lens surface is modified by virtue of a third spectacle lens surface being fitted to the difference edge curve and at least one portion of the third spectacle lens surface being overlaid on the second spectacle lens surface.

* * * * *

UNITED STATES PATENT AND TRADEMARK OFFICE
CERTIFICATE OF CORRECTION

| | |
|---|---|
| PATENT NO. | : 11,693,258 B2 |
| APPLICATION NO. | : 17/676528 |
| DATED | : July 4, 2023 |
| INVENTOR(S) | : Wietschorke |

Page 1 of 1

It is certified that error appears in the above-identified patent and that said Letters Patent is hereby corrected as shown below:

In the Specification

Column 11, Line 46: change "el se" to --else--

Signed and Sealed this
Twenty-second Day of August, 2023

Katherine Kelly Vidal
*Director of the United States Patent and Trademark Office*